United States Patent [19]

Yunoki

[11] Patent Number: 4,878,216
[45] Date of Patent: Oct. 31, 1989

[54] METHOD FOR MANAGEMENT OF LOGICAL CHANNELS FOR ISDN PACKET SERVICE

[75] Inventor: Hideo Yunoki, Tokyo, Japan
[73] Assignee: Fujitsu Limited, Kawasaki, Japan
[21] Appl. No.: 163,096
[22] Filed: Mar. 2, 1988
[30] Foreign Application Priority Data Mar. 2, 1987 [JP] Japan .................................. 62-045167

[51] Int. Cl.⁴ ............................................... H04M 3/00
[52] U.S. Cl. ..................................... 370/60; 370/110.1
[58] Field of Search ....................... 370/60, 94, 95, 58, 370/110.1

[56] References Cited

U.S. PATENT DOCUMENTS

| | | | |
|---|---|---|---|
| 4,596,010 | 6/1986 | Beckner et al. | 370/60 |
| 4,688,214 | 8/1987 | DeWitt et al. | 370/94 |
| 4,713,806 | 12/1987 | Oberlander et al. | 370/58 |
| 4,720,850 | 1/1988 | Oberlander et al. | 370/62 |

FOREIGN PATENT DOCUMENTS 61-227448 10/1986 Japan .

*Primary Examiner*—Douglas W. Olms
*Assistant Examiner*—Melvin Marcelo
*Attorney, Agent, or Firm*—Staas & Halsey

[57] ABSTRACT

A method for management of logical channels essential for packet communication between an ISDN and subscribers. An ISDN cannot maintain details on each of the number of pieces of data terminal equipment in each subscriber. Therefore, the data terminal equipment returns to the ISDN the logical channel group number (LCGN) which has been allotted to itself upon recipt of a package at the ISDN. The ISDN then refers to the logical channel management memory corresponding to the specified data terminal equipment using that LCGN, while the data terminal equipment refers to the logical channel management memory in its own terminal adapter, with both thus obtaining the information required for the start of the packet communication.

Further, when forming in the ISDN a logical channel management memory corresponding to a newly established data terminal equipment, direct registration is performed directly between the ISDN and data terminal equipment automatically for the LCGN, etc.

14 Claims, 13 Drawing Sheets

METHOD FOR MANAGEMENT OF LOGICAL CHANNELS FOR ISDN PACKET SERVICE

BACKGROUND OF THE INVENTION

1. Field of the Invention

The present invention relates to a packet service in an integrated service digital network (ISDN), more particularly, to a method for management of logical channels for a packet service.

An ISDN is meant to integrate all existing services on packet networks, telephone networks, and telex networks into a single whole. Various studies are underway on realization of such a network. Among these, the present invention refers in particular to a D-channel and/or B-channel packet handling method in ISDN. At the present time, a packet handler is used for packet processing interworking with main exchange via the common channel signaling method.

Various questions arise when considering how to completely integrate packet switching service in an ISDN. Among these, the present invention takes up as one of its topics the provision of a number of pieces of data terminal equipment (DTE) at each subscriber access interface.

2. Description of the Related Art

When seen from an exchange, logical channel number areas (LCN) are managed for each subscriber independently. That is, in the ISDN, LCN's are allotted in correspondence to the subscribers, e.g., 10 LCN's for one subscriber and 15 LCN's for another. The exchange side does not maintain information on how many LCN's are allotted to individual pieces of data terminal equipment in the case of each subscriber being provided with a number pieces of data terminal equipment. The omission by the exchange side of such management of characteristics of individual terminals is approved in CCITT recommendations. The exchange side need not know what the terminal equipment on the subscriber side is comprised of. In the final analysis, it is impossible to separately define logical channels for each data terminal equipment and impossible to allot the optimal number of ICN's for each data terminal equipment under the same access interface. This is disadvantageous when shifting to a full-scale ISDN and when the pieces of data terminal equipment of each subscriber become increasingly complicated.

Further, each data terminal equipment must have the same number of LCN's and the "logical channel range" as spoken of in the CCITT recommendation X.25 for determining methods of use of LCN's must also be the same.

SUMMARY OF THE INVENTION

The present invention was made to resolve the above-mentioned problems and has as its object the providing of a method for management of logical channels for a packet service free from the restrictions of the above-mentioned conditions and separate allotment of LCN's for each of a number of pieces of data terminal equipment of each subscriber. In addition, providing a method for management of logical channels for an ISDN packet service wherein the ISDN side and terminal side can both be realized with some slight design modifications to current constructions.

To achieve the above-mentioned object, the present invention allots an LCGN in the ISDN in advance for each piece of data terminal equipment. When there is a termination at said data terminal equipment, the data terminal equipment notifies the ISDN of the LCGN, whereby the packet can be received. This in turn enables the ISDN to offer a packet communication service without separate management of each piece of data terminal equipment at each subscriber side. Note that the data terminal equipment in the present invention is a packet mode terminal, that is, a computerized terminal under the CCITT X.25 which can handle a plurality of virtual circuits (VC). This packet mode terminal is connected to ISDN through a terminal adapter (TA).

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Before describing the embodiments of the present invention, the related art and the disadvantages thereof will be described with reference to the related figures.

Figure 1:
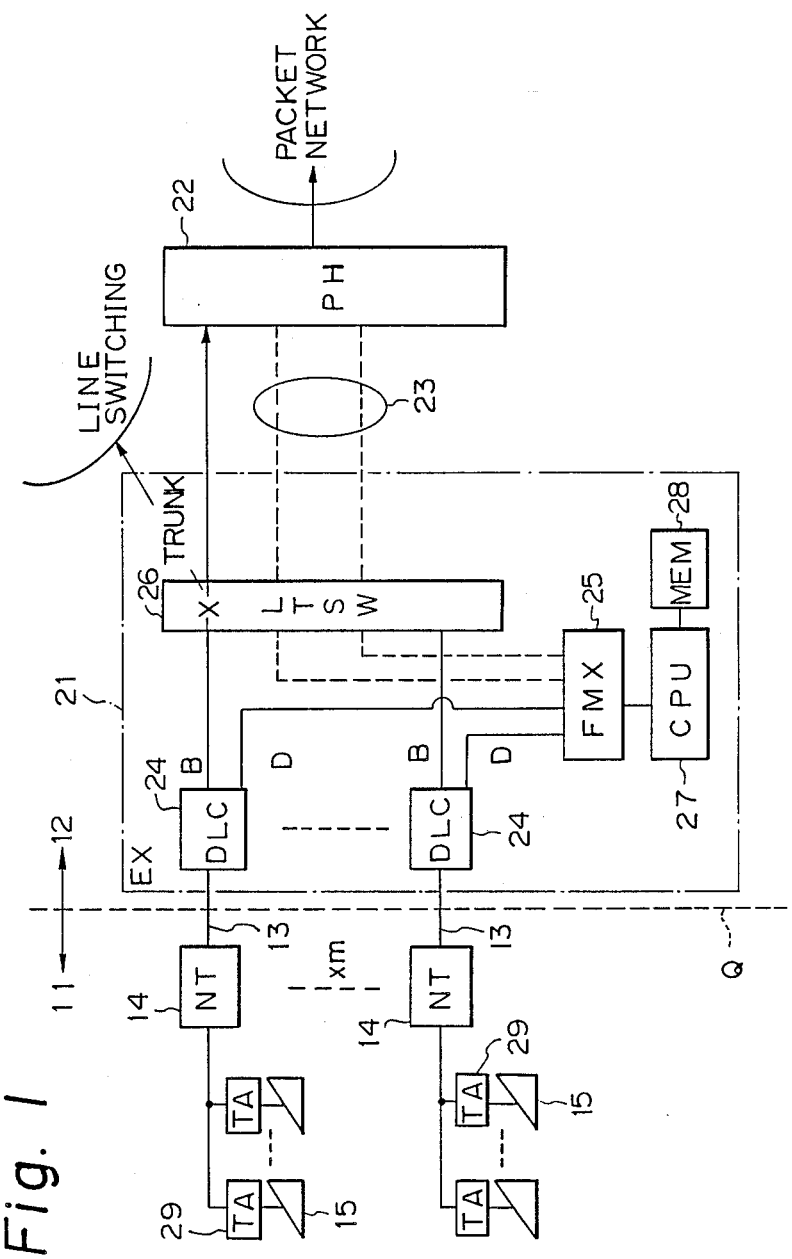
FIG. 1 is a block diagram illustrating an example of an ISDN to which the present invention is applied.

FIG. 1 is a view showing an example of an ISDN to which the present invention is applied. In the figure, the left side section set apart by the dotted line Q represents the data terminal equipment side 11, i.e., the subscriber side, and the right side represents the ISDN side 12. The data terminal equipment side 11 and ISDN side 12 are connected by subscriber lines 13. In the middle of the subscriber lines 13 are inserted network termination units (NT) 14, which terminate the physical layer of the subscriber lines. Each subscriber is provided with a plurality of pieces of data terminal equipment 15.

The ISDN side 12 is provided with, mainly, an exchange (EX) 21 and packet handler (PH) 22. The PH performs the interwork with the packet network. The exchange 21 is, for example, comprised of digital line cards (DLC) 24 which terminate the digital lines, a frame multiplexer (FMX) 25 which receives D-channel information from the DLC's 24, determines which permanent path 23 should be used for the packet handler 22, and performs frame multiplexing on the packet information for the path selected, a line concentrator time switch (LTSW) which receives as inputs the D-channel information from the FMX 25 and B-channel information from the DLC's 24 and switches each, and a central processing unit (CPU) 27 which executes the ISDN protocol and controls the FMX together with a main memory (MEM) 28. Since it is assumed that each piece of data terminal equipment is an existing packet terminal, it is necessary to modify the protocol for the ISDN and therefore a terminal adapter (TA) 29 is provided. However, logical channels are important means for packet communication service, with a logical channel allotted to each of the permanent virtual circuits or the logical channels dynamically allotted like virtual calls. The main memory (MEM) 28 is used to reserve various call control information related to B-channel switching and D-channel permanent path.

Figure 2:
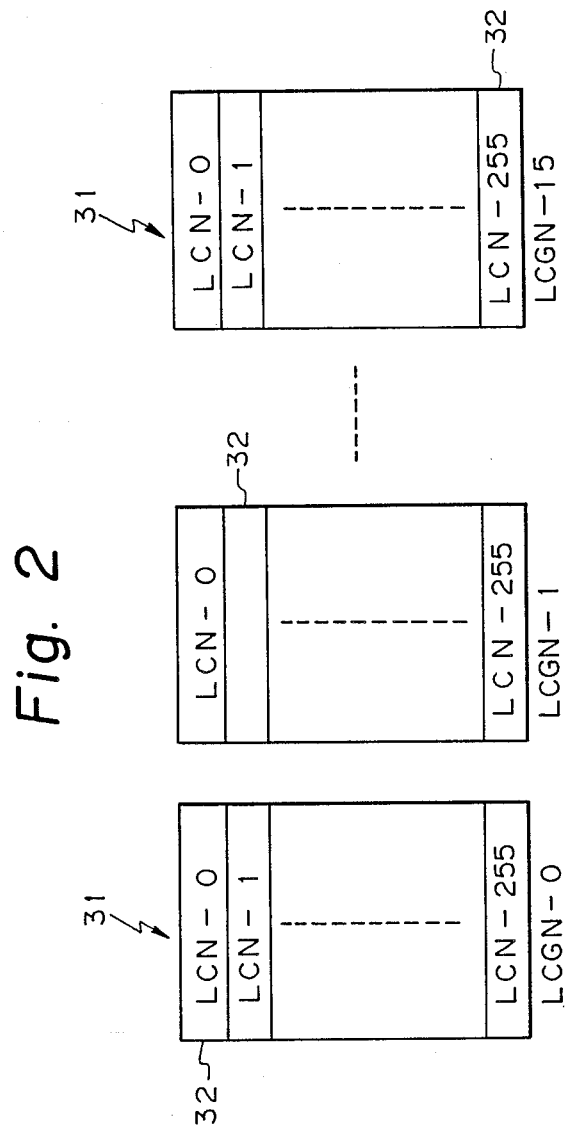
FIG. 2 is a diagram illustrating a specific example of a known construction of a logical channel.

FIG. 2 shows a specific example of a known construction of logical channels, comprised of a maximum number of 16 (LCGN-0 to LCGN-15) logical channel group number (LCGN) areas 31. Each LCGN area 31 consists of a maximum number of 256 LCN's 32 and therefore each subscriber can logically use a total of 4096 (256×16) LCN's as desired.

As mentioned above, when seen from the exchange 21, the LCN's are managed for each subscriber 13. That is, in the ISDN, LCN's are allotted in correspondence to the subscribers, e.g., 10 LCN's for a subscriber S1 and 15 LCN's for a subscriber S2. The exchange side does not maintain information on how many LCN's are allotted to individual pieces of data terminal equipment in the case of each subscriber being provided with a number of pieces of data terminal equipment. Thus, as mentioned above, the exchange side need not know what the terminal equipment on the subscriber side is comprised of. In the final analysis, it is impossible to separately define logical channels for each data terminal equipment and impossible to allot the optimal number of LCN's for each data terminal equipment. This is disadvantageous when shifting to a full-scale ISDN and when the pieces of data terminal equipment of each subscriber become increasingly complicated. Further, as mentioned above, each data terminal equipment must have the same number of LCN's and the "logical channel range" as spoken of in the CCITT recommendation X.25 for determining methods of use of LCN's must also be the same.

Figure 3:
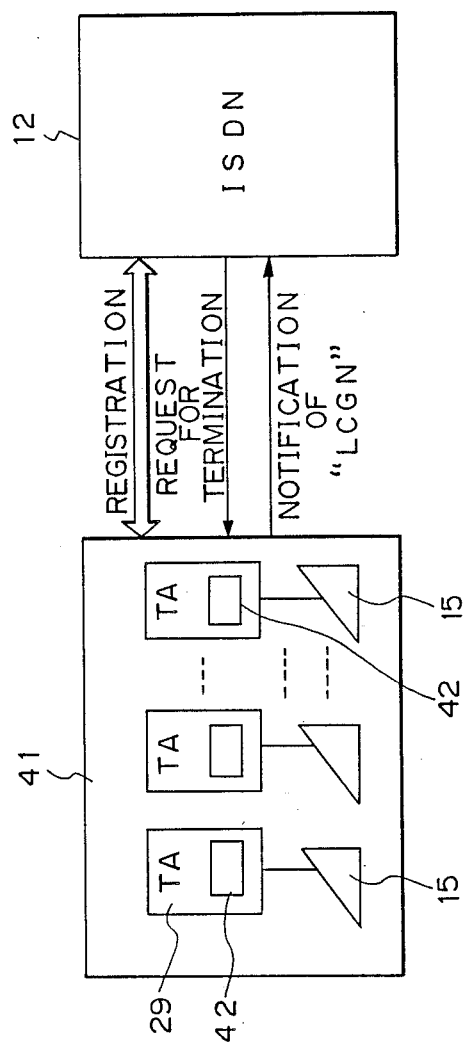
FIG. 3 is a view explaining the principle of the process of the present invention.

FIG. 3 is a view for explaining the principle of the method according to the present invention. In the figure, each subscriber 41 is provided with a logical channel management memory 42 for each terminal adapter. It defines the LCGN areas 31 (FIG. 2) used by the corresponding data terminal equipment 15 to avoid coincidence of the same, registers this in the memory 42, and registers the number of idle virtual circuits in the LCGN area in the memory 42. The defined LCGN and the number of LCN's used are notified in advance when a subscriber enters the ISDN and a corresponding area is secured in the ISDN logical channel management memory.

On the other hand, when there is a request for termination in one piece of data terminal equipment at the subscriber, the subscriber side notifies the ISDN side of the LCGN which said data terminal equipment uses in accordance with the contents of the memory 42.

The ISDN side, as mentioned above, does not have to be aware of each of the pieces of data terminal equipment in the subscribers and need only, at the time of entry, secure in the ISDN enough area for the LCGN for which use is desired and enough area for the necessary number of LCN's.

For call origination of a data terminal equipment, the subscriber notifies the ISDN side of the LCGN which the data terminal equipment is using and then uses the LCGN. Conversely, in a request for termination at a data terminal equipment, since the ISDN side cannot recognize the LCGN which the data terminal equipment uses, the subscriber notifies the ISDN side of the LCGN used, whereupon the ISDN sets an idle LCN in the LCGN area and starts the packet communication. At this time, the content of a first memory area in the memory 42 in the terminal adapter is viewed to confirm that packet communication is now possible and then the termination packet is received.

Therefore, the work at the terminal adapter consists solely of notification of the LCGN to the ISDN side and updating of the contents of the first memory area in the memory 42. Achievement of the object of the present invention does not place that much of a load on the terminal adapter. That is, the terminal adapter does not completely terminate the packet layer, but just manages the memory area. When there is a termination request, just the first memory area is viewed, a judgment made on whether termination is possible, and a response made to the ISDN side with corresponding LCGN defined in the second memory area 52 in the memory 42. Further, since the memory 42 is provided to define the LCGN at the subscriber, no burden is placed on the ISDN either.

Figure 4:
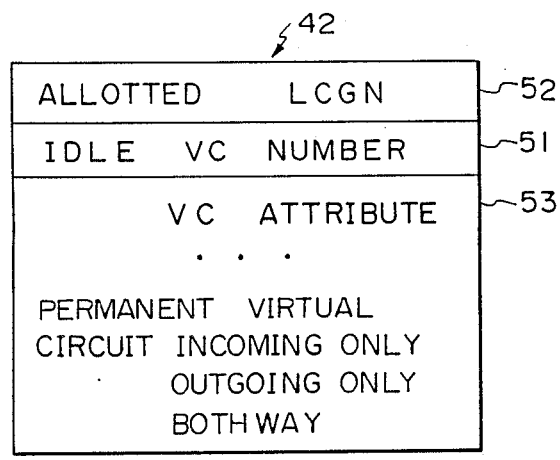
FIG. 4 is a diagram illustrating an example of the construction of a logical channel management memory 42 for each terminal adapter.

FIG. 4 is a view showing an example of the construction of a logical channel management memory 42 of each terminal adapter. In the figure, the aforementioned first memory area in the memory 42 is shown by reference numeral 51. Indication as to whether packet communication is possible is performed using the number of idle virtual circuits as a parameter. When the number of idle virtual circuits is not zero, packet communication is possible. Zero number of idle virtual circuits means all the LCN's for packet communication are being used. Note that each time a communication packet is received, the number of idle virtual circuits is reduced by 1 (−1). When one call is completed, it is increased by 1 (+1). The LCGN to be used is registered in the second memory area 52 in the memory 42. The number of idle virtual circuits in the LCGN is shown by the above-mentioned idle virtual circuit number memory area 51. Further, there is a third memory area 53 for showing the attributes of the virtual circuits of the LCGN. The attributes of the virtual circuits correspond to the LCN range of the CCITT recommendation X.25. For example, it is possible to define the following:

(1) All LCN's in the LCGN are permanent virtual circuits.

(2) All in the LCGN are exclusively for incoming calls.

(3) All in the ICGN are for two-way communications.

(4) All in the LCGN are exclusively for outgoing calls.

Figure 5:
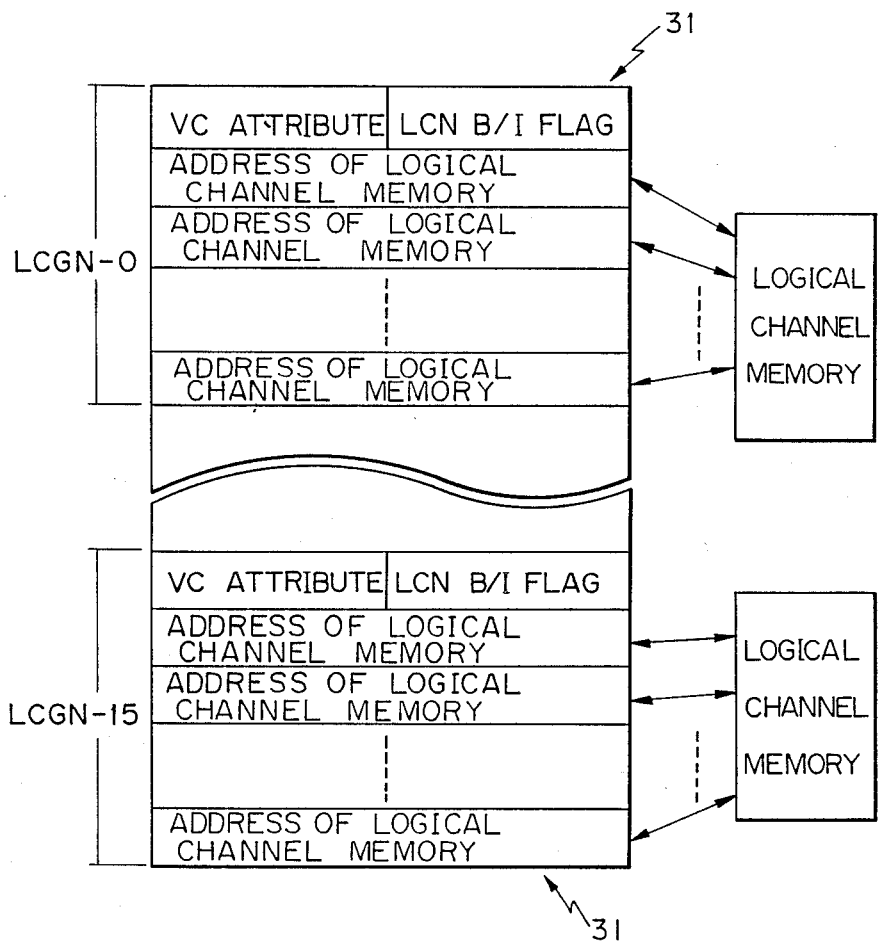
FIG. 5 is a diagram illustrating an example of the construction of a logical channel management memory on the ISDN side.

FIG. 5 is a view illustrating an example of the construction of a logical channel management memory on the ISDN side. The LCGN area 31 of FIG. 2 is comprised of the LCGN-0 to LCGN-15, each of which is provided with an area showing the virtual circuit attributes, an LCN busy/idle flag area, and an address area. The LCN busy/idle flag area has a number of flags showing the busy or idle state of the LCN's exactly corresponding to the number of LCN's. Each address area has written in it an address for accessing the logical channel memory at the right side of the figure. The logical channel memory is in the memory area 28 (in the packet handler) and is a working area in which is registered control information required for actual call processing. Note that the control information is registered upon entry into the ISDN.

Figure 6A:
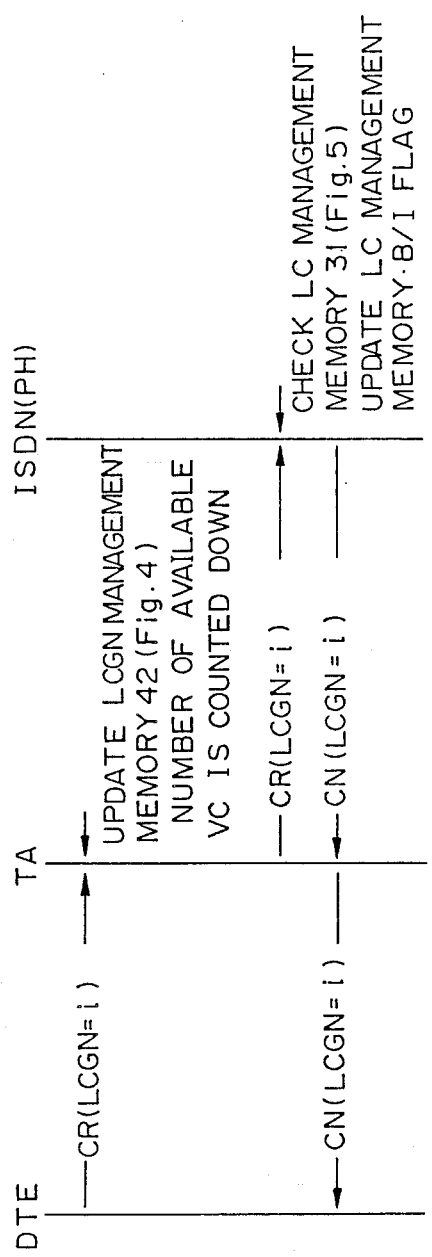
FIG. 6A is an arrow diagram showing the processing when originating a D-channel packet.
Figure 6B:
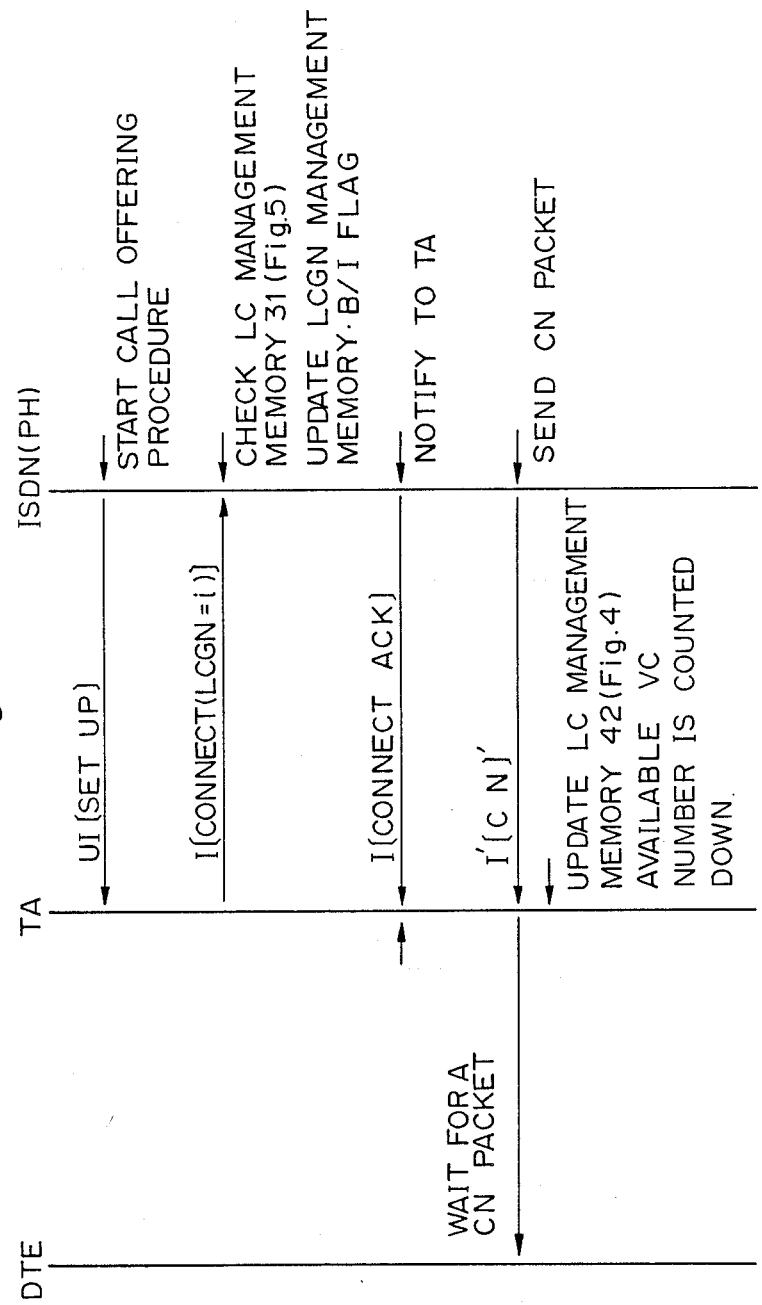
FIG. 6B is an arrow diagram showing the processing when terminating a D-channel packet.

FIG. 6A is an arrow diagram showing the processing when originating a D-channel packet. FIG. 6B is an arrow diagram showing the processing when terminating a D-channel packet. In FIG. 6A, the three vertical lines indicate the data terminal equipment (DTE), terminal adapter (TA), and ISDN, respectively. The ISDN is, specifically, the packet handler. In the figure, CR at the top left is a call request. The data terminal equipment is allotted, for example, "LCGN=i". The terminal adapter updates the logical channel management memory. That is, it reduces the number of idle virtual circuits (number of available virtual circuits) by 1. Subsequently, it notifies the call request (CR) to the packet handler in the ISDN.

The packet handler checks the logical channel management memory 31 (FIG. 5) to confirm if there is an available logical channel and notifies the call termination (CN) through the terminal adapter to the data terminal equipment. At this time, the packet handler updates the busy/idle flag in the memory 31. Therefore, the data terminal equipment can originate a packet.

In FIG. 6B, upon termination of the D-channel, the packet handler of the ISDN first starts the call offering procedure (CCITT recommendation X.31). The message at that time is UI [SET UP]. UI is an unnumbered information frame at layer 2 (CCITT Q.932). Receiving UI, the terminal adapter returns I [CONNECT (LCGN=i)] to the packet handler. I is an information frame at layer 2 (CCITT Q.921). One of the characteristics of the present invention is the insertion of this LCGN=i. The packet handler checks the logical channel management memory 31, selects an idle LCN, and rewrites a corresponding bit in the busy/idle flag as busy. Using the selected LCN, an I [CONNECT ACK] message (ACK: acknowledge) is returned to the terminal adapter. The terminal adapter further waits for the CN packet to be transmitted. Finally, I'[CN]' is transmitted from the packet handler. The apostrophe is given since a previous procedure corresponded to layer 3 of the ISDN (CCITT Q.931) and now layer 3 of the packet (CCITT X.25) is being shifted to. Receiving the I'[CN]' message, the terminal adapter updates the memory 42. That is, it reduces the number of idle virtual circuits (number of available virtual circuits) by 1.

Figure 7:
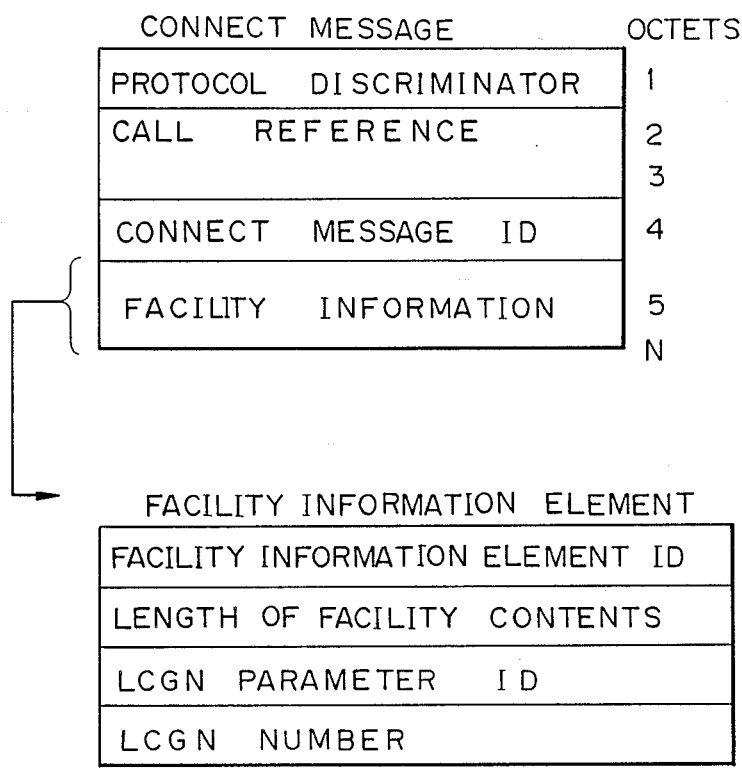
FIG. 7 is a diagram illustrating an example of the format of a connect (LCGN) message in FIG. 6B.

FIG. 7 is a view illustrating an example of the format of a connect (LCGN) message in FIG. 6B. In the facility information in the figure is accommodated LCGN information which is returned to the packet handler, a characteristic of the present invention.

Figure 8:
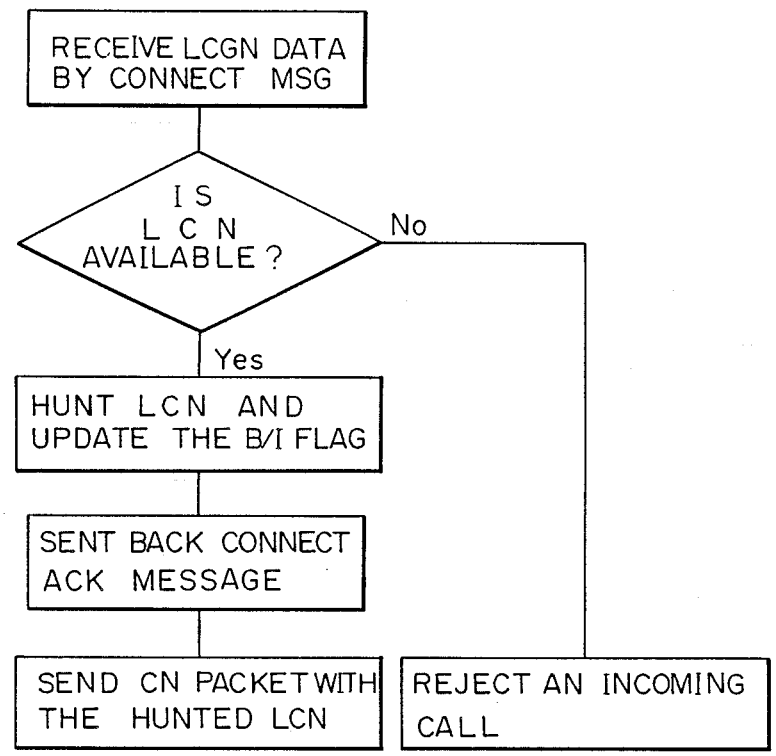
FIG. 8 is a flow chart of the termination processing performed by the packet handler in the ISDN.

FIG. 8 is a flow chart of the termination processing performed by the packet handler in the ISDN. Note that the "no" route in the second step is normally almost never activated, since this check must have already be done at terminal side.

Figure 9:
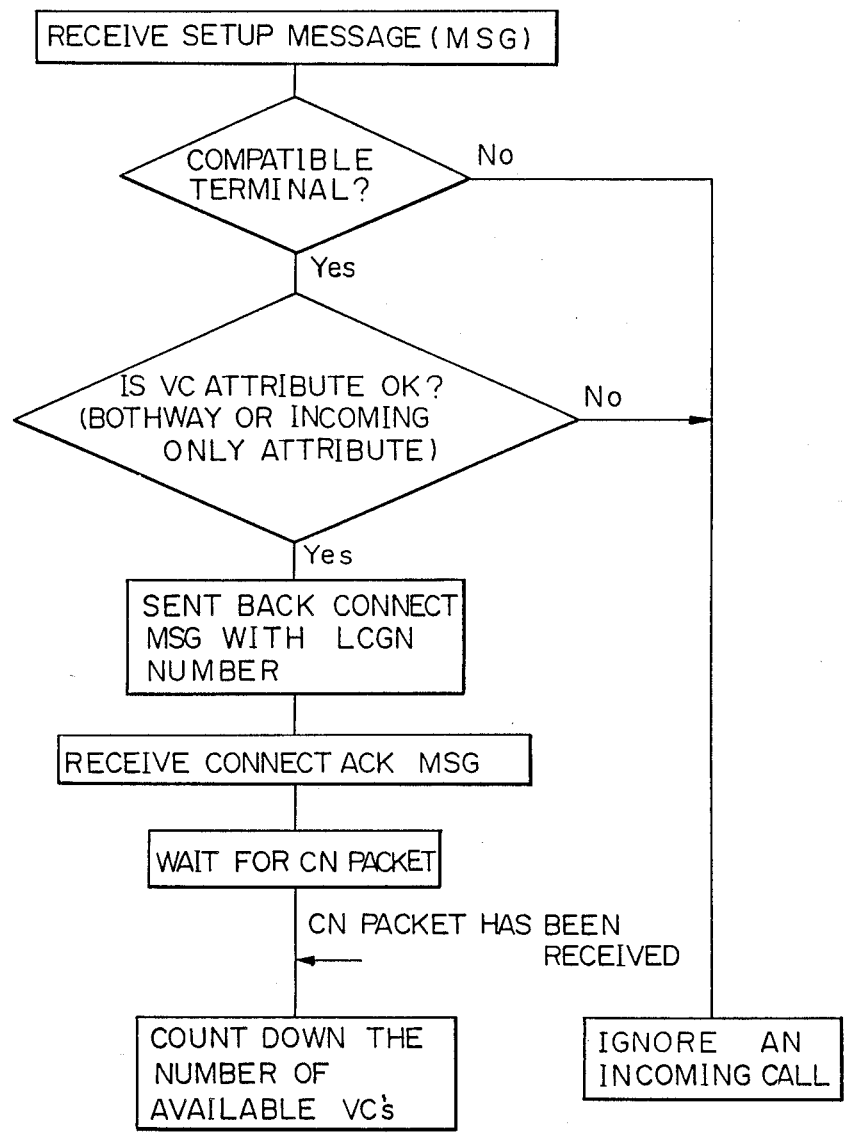
FIG. 9 is a flow chart for termination processing performed by a terminal adapter.

FIG. 9 is a flow chart for termination processing performed by the terminal adapter. When there is no terminal (compatible terminal) which can receive a terminated call or when the virtual circuit attributes are not suitable, the incoming call is neglected.

Returning to FIG. 3, exchange of a registration message (solid line) is newly performed between the subscriber 41 and the ISDN 12. In the working of the present invention, in the ISDN, it is essential that there be an accurate logical channel management memory 31 in each subscriber. Therefore, when a data terminal equipment is newly installed in some subscriber, the characteristics of the newly established data terminal equipment must be registered in the ISDN. Clearly, it would be very convenient if this registration could be directly performed by user. Therefore, a technique for direct registration is proposed.

Figure 10:
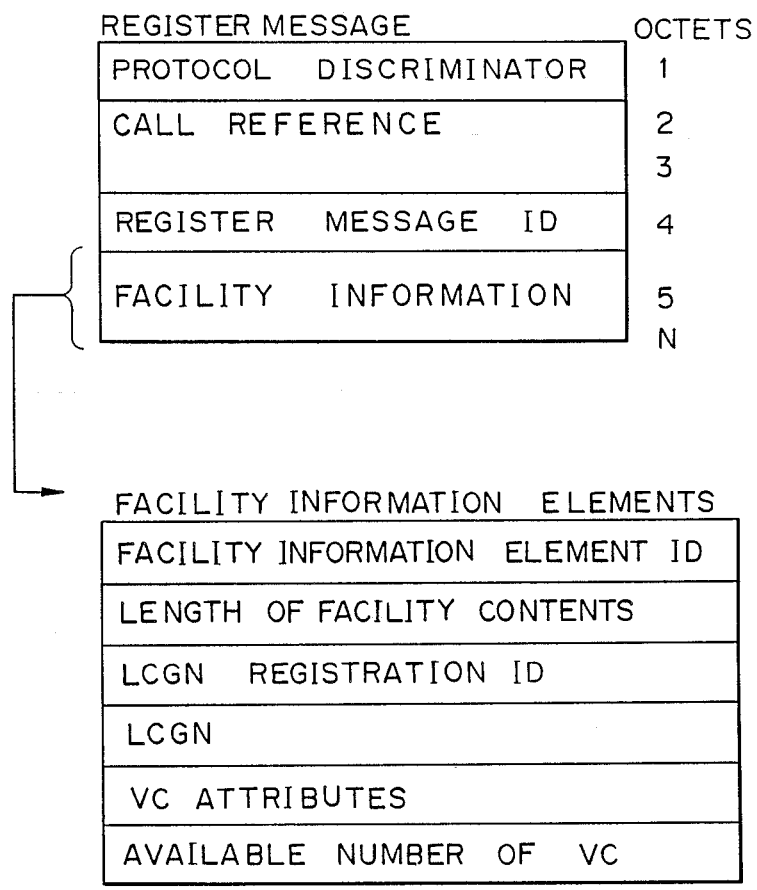
FIG. 10 is a diagram illustrating an example of the format of a registration message.

FIG. 10 is a view showing an example of the format of a registration message. The elements of the facility information in the message are shown in greater detail. Especially important among the facility information elements are the LCGN allotted to the newly established data terminal equipment, the virtual circuit attributes, and the number of available virtual circuits.

Figure 11:
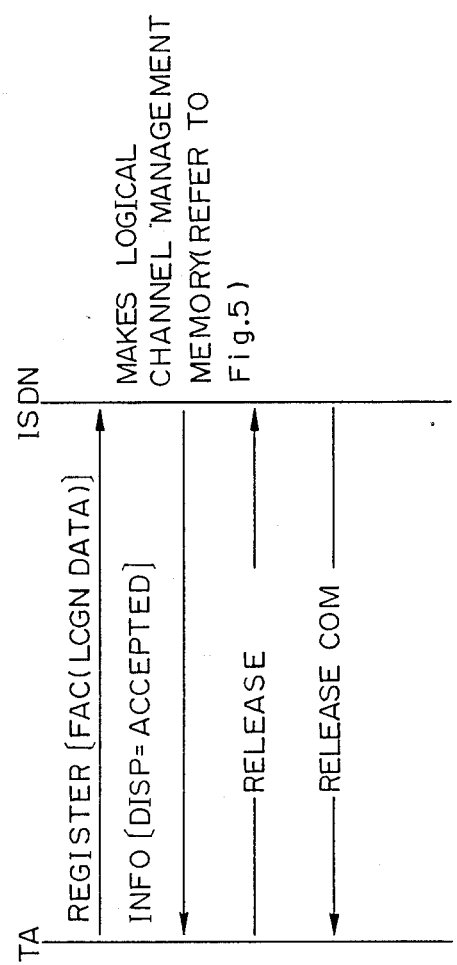
FIG. 11 is an arrow diagram showing an example of the automatic registration procedures.

FIG. 11 is an arrow diagram showing an example of the registration procedure. The meaning of the abbreviations in the figure are as follows: FAC means facility information elements, DISP display information elements, INFO information message, and RELEASE COM release complete message.

Figure 12:
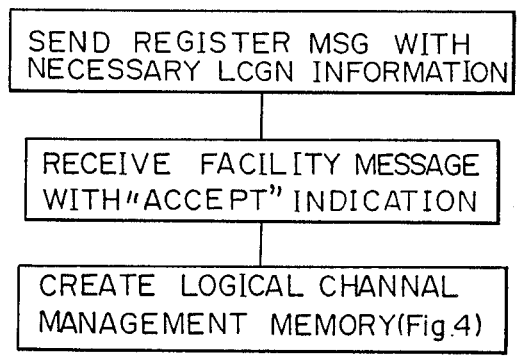
FIG. 12 is a flow chart showing the processing in a terminal adapter in automatic registration.

FIG. 12 is a flow chart showing the processing in the terminal adapter in the registration. As shown in the figure, the terminal adapter sends the LCGN information to the packet handler, receives an "accept" signal from the packet handler, then completes the contents of the memory 42 in it (FIG. 4).

Figure 13:
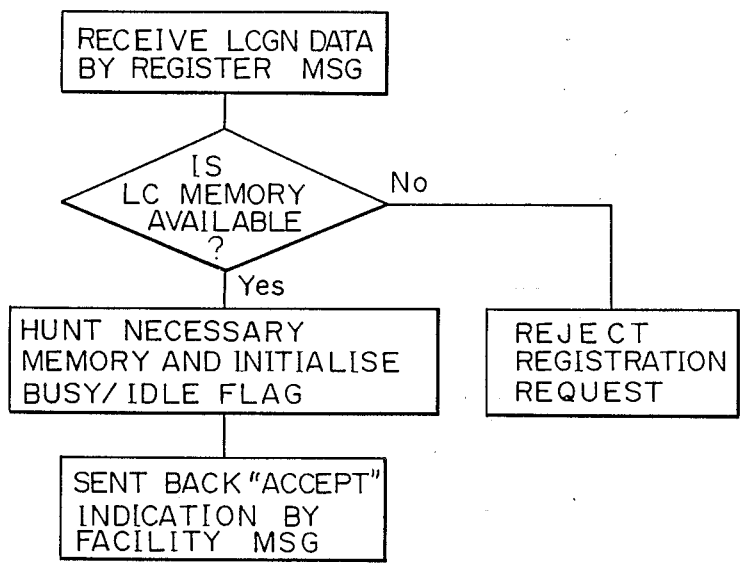
FIG. 13 is a flow chart showing the processing in a packet handler in automatic registration.

FIG. 13 is a flow chart showing the processing in a packet handler in registration. As shown in the figure, packet handler confirms that there is space in the logical channel management memory 31 (FIG. 5), then newly allocates a busy/idle flag in the memory 31, and initializes the content of the the busy/idle flag. Later, it sends back an "accept" signal to the newly established data terminal equipment. Here, the registration procedure ends and the newly established data terminal equipment is substantially activated.

As explained above, according to the present invention, it is possible to manage logical channels separately, even to each of the plurality of pieces of data terminal equipment connected to the subscribers, without any major design modifications on either the terminal adapter side or ISDN side.

I claim:

1. A method for management of logical channels for packet service in an integrated services digital network used for packet communications between subscribers, where each subscriber has a number of pieces of data terminal equipment and communication packets are handled via terminal adapters, each terminal adapter provided for one piece of the data terminal equipment, said method comprising the steps of:
   (a) allotting a logical channel group number for each piece of the data terminal equipment; and
   (b) storing the logical channel group number in logical channel management memories, each corresponding to one piece of the data terminal equipment.

2. A method for management of logical channels according to claim 1, wherein virtual circuits, having attributes, are provided between the integrated services digital network and each piece of the data terminal equipment, and
   wherein said allotting in step (a) comprises the substeps of:
   (ai) allotting the logical channel group number in the integrated services digital network for each of the pieces of data terminal equipment prior to transmission of the communication packets therefrom; and
   (aii) defining available logical channels for each piece of the data terminal equipment, and
   wherein said method further comprises the step of (c) maintaining, for each logical channel group number, available logical channel numbers and the attributes of the virtual circuits in the logical channel management memories.

3. A method for management of logical channels according to claim 2, further comprising the steps of:
   (d) notifying the integrated services digital network of the logical channel group number allotted to the data terminal equipment during a call setup, and
   (e) designating, by the integrated services digital network, the logical channels used from the data terminal equipment for the packet communications.

4. A method for management of logical channels according to claim 3, wherein the integrated services digital network uses first, second and third layers for the packet communications, and
   wherein said notifying of the logical channel group number required at the third layer of the packet communications is incorporated into a call offering procedure based on CCITT X.31 at the third layer of the integrated services digital network.

5. A method for management of logical channels according to claim 4,
   wherein each of the logical channel management memories is provided in the terminal adapter corresponding to one piece of the data terminal equipment and includes at least a first memory area, and
   wherein said method further comprises the steps of:
   (f) determining whether a specific piece of the data terminal equipment can perform packet communication; and
   (g) initiating packet communications from the specific piece of data terminal equipment only when the first memory area indicates packet communication is possible.

6. A method for management of logical channels according to claim 5, wherein said maintaining in step (c) includes the substeps of:
   (ci) storing, in the first memory area, a number of idle virtual circuits; and
   (cii) reducing the number of idle virtual circuits by 1 each time a packet communication enable signal to sent to the integrated services digital network.

7. A method for management of logical channels according to claim 6, wherein the number of idle virtual circuits is reduced by 1 when a termination request packet is received by the integrated services digital network.

8. A method for management of logical channels according to claim 5,
   wherein each of the logical channel management memories in one piece of the data terminal equipment has a second memory area and a third memory area,
   wherein said storing in step (b) includes the step of registering the logical channel group number allocated to one piece of the data terminal equipment into the second memory area, and
   wherein said maintaining in step (c) further includes the substep of (ciii) registering the attributes of the virtual circuit used by the data terminal equipment into the third memory area.

9. A method for management of logical channels according to claim 2, wherein the integrated services digital network includes a main memory unit,
   wherein each of the logical channel management memories is provided in the integrated services digital network and includes a busy/idle flag area for registering the state of logical channel numbers and a memory area for registering the addresses corresponding to the logical channel numbers being used, the addresses designating working areas of the logical channel management memories in the main memory unit of the integrated services digital network; and
   wherein said maintaining in step (c) includes the substeps of:
   (ci) storing an operation state of the logical channel numbers in the busy/idle flag area, and
   (cii) storing control information necessary for call processing of the packet communications in the working areas.

10. A method for management of logical channels according to claim 9, wherein said maintaining in step (c) further includes, when the integrated services digital network newly designates the logical channel numbers necessary for packet communication, the substeps of:
    (ciii) selecting one logical channel number flagged as idle in the busy/idle flag area, and
    (civ) rewriting a the bit in the busy/idle flag area corresponding to the logical channel number selected as busy.

11. A method for management of logical channels according to claim 1, wherein said method further includes, when a piece of data terminal equipment is newly installed by connection to a subscriber line, the step of:
    (c) notifying the integrated services digital network of the logical channel group number allotted to the piece of newly installed data terminal equipment and the number of logical channels in the logical channel group number; and
    (d) registering characteristics of the piece of newly installed data terminal equipment directly in the integrated services digital network from the data terminal equipment through the subscriber line.

12. A method for management of logical channels according to claim 11, wherein said registering in the integrated services digital network in step (d) includes transmitting a specific registration message containing at least the logical channel group number, virtual circuit attributes, and available number of virtual circuits in a facility information element of the specific registration message.

13. A method for management of logical channels according to claim 2, wherein the data terminal equipment is a computerized terminal satisfying CCITT X.25 and can handle a plurality of virtual circuits.

14. A method for management of logical channels according to claim 2, wherein said maintaining in step (c) is performed in the integrated services digital network by a packet handler of the integrated services digital network.

* * * * *

UNITED STATES PATENT AND TRADEMARK OFFICE
CERTIFICATE OF CORRECTION

PATENT NO. : 4,878,216
DATED : October 31, 1989
INVENTOR(S) : Hideo YUNOKI It is certified that error appears in the above-identified patent and that said Letters Patent is hereby corrected as shown below:

Title Page:
Abstract, line 7, change "recipt" to --receipt--.

Col. 1, line 36, delete "of"
(second occurrence only).

Col. 1, line 43, change "ICN's" to --LCN's--.

Col. 2, line 22, change "view"
to --block diagram--.

Col. 4, line 63, change "ICGN" to --LCGN--.

Signed and Sealed this

Fourth Day of September, 1990

Attest:

HARRY F. MANBECK, JR.

*Attesting Officer*      *Commissioner of Patents and Trademarks*